United States Patent Office 3,314,981
Patented Apr. 18, 1967

3,314,981
LIQUID POLYTERPENE AND METHOD
Arthur R. Clark and Margaret M. Clark, both of P.O. Box 283, Spring Lake, N.J. 07762
No Drawing. Filed Mar. 11, 1965, Ser. No. 439,061
27 Claims. (Cl. 260—448)

This invention relates to the polymerization of turpentine or fractions thereof via cationic-catalytic initiation. More particularly, it relates to a method for controlling the molecular weights of the polymers formed by reacting turpentine or fractions thereof with certain anhydrous metal halides ($MX_x$) such as $AlCl_3$, $AlBr_3$, $TiCl_4$, $FeCl_3$, $BeCl_2$, $SnCl_4$, $ZnCl_2$, $BiCl_3$, $SbCl_3$, $CrCl_3$, etc.

Heretofore, it has been known to polymerize certain fractions of turpentine to solid polymers using special consideration for low temperatures such as $-35°$ C. to approximately $60°$ C. with long reaction periods from ten to forty-eight hours. Carmody—U.S. #2,391,293 used turpentine to produce solid polymers by controlling the temperature. Likewise, Thomas—U.S. #1,939,932, Rummelsburg—U.S. #2,370,688, Borglin—U.S. #2,405,558, Suhanin—U.S. #2,555,255, Carter—U.S. #2,734,892, and Maguire—U.S. #2,802,813 demonstrated the various processes for producing solid resins by controlling the temperature from $-35°$ C. to approximately $35°$ C. If higher temperatures were used, they obtained darker colored polymer resins with some degree of lower softening points. Cooper—U.S. #1,938,320 used anhydrous aluminum chloride ($AlCl_3$) with turpentine at $50°$ C. or below. The preferred temperature was $30°$ C. or below. Zero ($0°$ C.) and below required too long a reaction period. Above $50°$ C. certain deleterious side reactions took place which caused darker colored products. Burroughs—U.S. #2,335,912 found it better to use only the beta-pinene from the turpentine to form solid resins.

We have found useful non-solid polymers of terpenes from turpentine and its fractions with high yields by controlling the molecular weights of the poly-terpenes by various means which will be demonstrated below. Under usual procedures one obtains either a solid or oily material with various amounts of unreacted turpentine or pyrolyzed turpentine products.

It has now been found possible to prepare liquid terpene polymers of controlled molecular weights with high commercial yields using increased reaction temperatures and greatly shortened reaction periods. The novel liquid polymers are heat-stable, non-toxic, non-phytotoxic, and non-sensitizing to the skin. Moreover, the liquid polymers have a molecular weight below about 500 and contain no unreacted terpenes.

We have also discovered that anhydrous metal halides react with turpentine (alpha and beta-pinene) at higher temperatures to form addition compounds such as $Al(C_{10}H_{16})_3Cl_3$. These co-ordination compounds during the heating process aid in the formation of liquid polyterpenes. These addition compounds are dark-red amorphous substances that form penetration compounds quite easily with water, acid, etc. We have found that these materials can be extracted, stored and used further for catalytic purposes without adding more anhydrous metal halides to the turpentine. These addition compounds of anhydrous metal chlorides need heat to form and are highly colored. Previous art desired to keep these colored compounds from forming. P. Pfeiffer, Z. Anorg. Chem., 24, 278, 1900 prepared the addition compound of pyridine with anhydrous chromium chloride ($CrCl_3$) and Arthur R. Clark (Ph.D. Thesis—1938—Pennsylvania State University— Manuscript available at University Microfilms, Ann Arbor, Michigan) prepared a quinoline addition compound with anhydrous chromium chloride ($CrCl_3$) and many penetration compounds of pyridine and quinoline with anhydrous chromium chloride ($CrCl_3$).

Briefly stated, the present invention comprises reacting polymerizable terpenes, preferably turpentine with an anhydrous metal halide that is non-gaseous at ambient temperature under controlled exothermic conditions to form coordination compounds that decompose during the processing to aid in the formation of liquid polyterpenes.

As to materials, the terpene can be any pure terpene, synthetic mixtures thereof, or naturally occurring terpene mixtures. Examples are alpha-pinene, beta-pinene, dipentene, terpinene, terpinolene, and various turpentines such as sulfate, wood, and gum. Of these the turpentine was perferred. American, Mexican, French, Russian, Spanish, etc. gum turpentines have been tried with approximately similar results and yields.

The catalyst used must be an anhydrous non-gaseous metal halide of the general formula $MX_n$ in which M is a metal from the Friedel-Crafts type, X is a halide and $n$ is an integer from 2 to 4. Examples are $AlCl_3$, $CrCl_3$, $AlBr_3$, $TiCl_4$, $SnCl_4$, $BeCl_2$, $FeCl_3$, $ZnCl_2$, $BiCl_3$, $SbCl_3$, $ZrCl_4$ and the like. Of these $AlCl_3$ is preferred.

The reaction conditions as well as the amount of anhydrous metal halide to terpene are very important. The anhydrous metal and terpene must be reacted at temperatures sufficiently high to form coordination complexes, such as $Al(X)_3Cl_3$ where X represents pinenes of various types as well as other terpenes within the turpentine mixtures found in various parts of the world.

As to proportions, the halide is added in the amount of about 0.1% to about 20%, based on the weight of the terpene. The preferred range is 3% to 5%. The amount of catalyst can vary dependent upon the moisture present in the terpene and the reactor system.

The coordination complexes are formed by adding about one-half of the total halide to the terpene and thoroughly mixing. Since the reaction is an exothermic one, heat is generated. The temperature rises and is kept within the range of about $100°$–$200°$ C. Additional amounts of halide are added during this period, and the temperature of the reaction is kept within these limits. The addition compound is formed in such a fashion that the decomposition compounds and penetration compounds are released from the polymer phase at the desired point of the reaction.

One of the important features of this process is to use small amounts of the metal anhydrous halide as is possible to create the polymerization to the desired effect. The addition compounds, its decomposition and penetration compounds should release themselves from the terpene polymer after the catalytic process thereby decreasing the amount of color to be removed from the polymer. The terpene polymer is dissolved in a solvent at this point and the insoluble matter is removed by filtration.

The following solvents can be used—aliphatic hydrocarbons: gasoline, petroleum naphtha, pentane, hexane, heptane, etc.; aromatic hydrocarbons: benzene, toluene, xylene, etc.; halogenated hydrocarbons: chloroform, ethylene dichloride, carbon tetrachloride, trichloroethylene, ethyl chloride, etc.; esters: methyl acetate, ethyl acetate, propyl acetate, isopropyl acetate, etc. The preferred solvents are those which boil below about 125° C. when mixed with turpentine and those which have very low water miscibility.

The solvent-polymer solution is neutralized with dilute solutions of Na(OH), Ca(OH)$_2$, NH$_4$(OH) or carbonates of magnesium, calcium, or mixtures of both (dry or paste forms as well) in order to remove any dissolved metal halide catalyst either as an addition, penetration, or other complex to reduce the color and block further polymerization. Ammonia and metal carbonates or combinations of both have been most effective due to their ability to neutralize the polymer-solvent phase and yet not cause sensitization to the skin or phytotoxicity due to excess alkali that cannot be removed from low molecular polyterpenes. These polyterpene polymers tend to emulsify much more readily than the high molecular poly-terpene polymers (solid types). The degree of washing to remove impurities must be kept to a minimum for this reason; otherwise, the yields drop considerably and the process is no longer a commercial procedure.

The anhydrous metal halide can be added in the 0–30° C. range and heated immediately to 60–200° C. The range of catalyst can be 0.1% to 20% by weight of the terpene present. The preferred amount is in the 3 to 5% range depending on the amount of moisture in the turpentine and reactor system. Our preferred temperature range is from 60–155° C. The turpentine is first heated to 125–130° C. to remove any moisture present and allowed to cool to 60° C. Fifty percent (50%) of the catalyst is added immediately and mixed thoroughly. Heat will generate and the temperature will rise with small increments of catalyst from this point wherein the 125–130° C. range is reached after 60% of the catalyst has been added. The temperature is allowed to drop at this point and a solvent such as an aliphatic or aromatic hydrocarbon is added. Esters and halogenated hydrocarbons can also be used. It is best to use a solvent that dissolves the polyterpene polymer but not the metal halide-pinene addition or penetration compounds. Those solvents that dissolve the latter compounds usually hold too much color in the finished polyterpene polymer. The mixture with the solvent is refluxed and later heated to 155° C. and allowed to cool with the addition of more solvent before neutralization as mentioned previously.

The color is reduced considerably in the neutralization process of the product with metal carbonates such as magnesium and calcium when mixed in an aqueous phase.

After the neutralization the material is filtered and the liquid polyterpene polymer-solvent phase is stripped of solvent and the liquid polyterpene polymer is collected. This product has a low viscosity index, zero acid number and saponification number, and an average molecular weight below 500.

The catalyst can be added to the terpene with or without solvent during the addition period. Also, one can allow the temperature to rise to the 165°–200° C. range with no solvent provided the excess heat is released via proper cooling plates.

With the proper precautions as given in our process, we obtained a liquid polyterpene polymer that was quite nontoxic (L.D.$_0$ and L.D.$_{50}$ in excess of 20,000), zero eye score, nonsensitizing to human skin, skin irritation score of 0.4, nonphytotoxic to plant life, and no primary skin irritation via the patch test. Because of these unique features, the product has commercial uses in cosmetics and toiletries as a softening agent; in agriculture as an adjuvant, sticker, life extender for pesticides, and protecting agent for ornamentals, etc.; in leather as a softening and preservative agent; in ceramic as a thickening agent; etc.

As we have now designated the generic aspects of this invention, the following specific examples are given as specific embodiments thereof. These specific examples should not be construed as limiting the invention in any way. All parts and percentages are by weight unless otherwise indicated.

*Example 1*

Two hundred parts of American gum turpentine were heated to 125–130° C. and allowed to cool to 60° C. Two and one half (2½) parts of anhydrous aluminum chloride (AlCl$_3$) were added immediately with stirring not allowing the temperature to rise above 125–130° C. range. Small increments of anhydrous aluminum chloride were added with cooling to remain below the 125–130° C. range until a total of three (3) parts of anhydrous aluminum chloride were added. The mixture was cooled down to 70–80° C. with the addition of 150 parts of heptane and allowed to reflux shortly after the addition of two parts of anhydrous aluminum chloride. The temperature was raised gradually to 155° C. and allowed to cool down to 80° C. At this point 150 parts of heptane were mixed with the polyterpene and the solution was decanted and filtered to remove all the solid phase derived from the aluminum chloride-pinene addition compound. The treated heptane polymer solution is mixed with 30 parts of CaCO$_3$·MgCO$_3$ plus 300 parts of water and mixed thoroughly until all the soluble catalyst has been removed and a very light color results in the heptane phase. The solids are removed via filtration and the water separated from the heptane phase. The heptane is stripped off leaving a liqiud polymer with the unique properties as given. Yield—85 to 92%; reaction time ½ to 1 hour.

*Example 2*

Two hundred parts of American gum turpentine were heated to 125–130° C. and cooled, and mixed with 150 parts of heptane and five parts anhydrous aluminum chloride with temperatures in the 0°–20° C. range. The temperature was immediately allowed to rise slowly to reflux temperature (95–105° C. range). The mixture is heated slowly to 155° C. and treated as given in Example 1. Yield—85–92%.

*Example 3*

Two hundred parts of American gum turpentine were treated via heat to 125–130° C. and cooled to 20–30° C. Then five (5) parts of anhydrous aluminum chloride were added and the temperature allowed to rise to the 165–200° C. range. At this point cooling plates were used to control the final temperature. The mixture was cooled to 80° C. and 150 parts of heptane were added to the mixture. The mixture was again heated gradually to 155° C. and treated as in Example 1. Yield—85 to 92%.

*Example 4*

Same procedure as in Example 1 only 300 parts of 1% ammonia water was used in place of thirty parts of CaCO$_3$·MgCO$_3$ for the neutralization.

*Example 5*

Two hundred parts of American gum turpentine were heated to 125–130° C., cooled and mixed with 150 parts of heptane and ten parts anhydrous zirconium tetrachloride with temperatures in the 0–20° C. range. Same procedure as given in Example 2.

*Example 6*

Two hundred parts of American gum turpentine were heated to 125–130° C., cooled and mixed with 150 parts of heptane and seven parts anhydrous titanium tetrachloride with temperatures in the 0–20° C. range. Same procedure as given in Example 2.

Example 7

Two hundred parts of American gum turpentine were heated to 125–130° C., cooled to 0° C. and 20 parts of anhydrous aluminum chloride were added slowly at a low temperature range 0–20° C. and allowed to heat up gradually with cooling plates to control extreme exothermic reaction. At 155° C. the reaction mixture was cooled and the dark-red amorphous compound was allowed to settle to the bottom and the 250 parts of heptane were added. As the temperature dropped the oily dark red amorphous compound became semi-solid. The liquid polymer was decanted off and the semi-solid compound was washed with heptane. The solid material was dried and incinerated via gravimetric procedures to yield 9.2% $Al_2O_3$. Theoretical $Al_2O_3$ for the addition compound of anhydrous aluminum chloride and pinenes $(Al(C_{10}H_{16})_3Cl_3)$ equals 9.42%.

Example 8

Two hundred parts of American gum turpentine were heated to 125–130° C., cooled to 60° C. Twelve (12) parts of anhydrous addition compound $(Al(C_{10}H_{16})_3Cl_3)$ —see Example 7—were added and the mixture was heated to the 125–130° C. range. The mixture was cooled down to 70–80° C. with the addition of 150 parts of heptane and 12 parts of the anhydrous addition compound $(Al(C_{10}H_{16})_3Cl_3)$—see Example 7. The same procedure was used as given under Example 1.

Example 9

Same procedure as given under Example 1 except that the calcium and magnesium carbonate were made into a paste with water before they were added to the heptane polyterpene solution.

It will be apparent that various changes and modifications can be made from the specific details set forth herein without departing from the spirit and scope of the invention as defined in the appended claims.

What we claim and desire to protect by Letters Patent is:

1. The herein described process of preparing a liquid polyterpene polymer, having a molecular weight below about 500, comprising the steps of reacting a polymerizable terpene or mixture of polymerizable terpenes and an anhydrous metallic halide that is non-gaseous at ambient temperature to form a coordination complex of said terpene and metallic halide, and slowly decomposing the complex to permit cationic catalyst of the terpene to polymerize the same, the temperature of the reaction being kept above 100° C. during formation of the complex and below about 200° C. during its catalytic and decomposition action.

2. A process according to claim 1, said mixture of terpenes being gum turpentine.

3. A process according to claim 1, said mixture of terpenes being sulfate turpentine.

4. A process according to claim 1, said mixture of terpenes being wood turpentine.

5. A process according to claim 1, said terpene being alpha pinene.

6. A process according to claim 1, said terpene being beta pinene.

7. The low molecular weight liquid polymer produced by the process of claim 1.

8. A coordination complex of a polymerizable terpene and an anhydrous metal halide that is non-gaseous at ambient temperature having the general formula:

$$M(C_{10}H_{16})_xR_n$$

in which M is a polyvalent metal, R is a halide, and $x$ and $n$ are integers from 2 to 4.

9. A coordination complex of a polymerizable terpene and anhydrous aluminum chloride having the formula:

$$Al(C_{10}H_{16})_3Cl_3$$

10. The process of preparing a coordination complex of a polymerizable terpene and an anhydrous metal halide that is non-gaseous at ambient temperature comprising the steps of reacting said terpenes and metallic halide at a temperature above about 100° C.

11. A process according to claim 1, said anhydrous metal halide being anhydrous aluminum chloride.

12. A process of preparing liquid polyterpene polymer, having a molecular weight below about 500, in high yields which comprises polymerizing a polymerizable terpene or mixture of polymerizable terpenes and an effective amount of a catalyst at a temperature ranging from about 100–200° C.; said catalyst being selected from the group of anhydrous metallic halides that are non-gaseous at ambient temperature and complexes of said anhydrous metallic halides.

13. A process according to claim 12, said mixture of terpenes being turpentine and said catalyst being anhydrous aluminum chloride and its derived complexes.

14. A process according to claim 12, said catalyst being present in an amount ranging from 0.1 to 20% by weight of polymerizable terpene or mixture of polymerizable terpenes with said catalyst calculated as an anhydrous metallic halide.

15. A process according to claim 12, said catalyst being present in an amount ranging from 0.1 to 20% by weight of turpentine and said catalyst calculated as $AlCl_3$.

16. A process of preparing liquid polyterpene polymer, having a molecular weight below about 500, in high yields which comprises polymerizing a polymerizable terpene or mixture of polymerizable terpenes in the presence of an complex to permit cationic catalyst action upon the terpene and polymerize the terpene with the temperature of the reaction being kept above 100° C. during the formation of the complex and below about 200° C. during its catalytic and decomposition action, the total decomposition of the catalyst being accomplished via a neutralizing agent.

organic solvent-coolant and an effective amount of a catalyst at a temperature ranging from about 100–200° C.; said catalyst being selected from the group of anhydrous metallic halides that are non-gaseous at ambient temperature and complexes of said anhydrous metallic halide.

17. A process according to claim 16, said organic solvent-coolant being an aliphatic hydrocarbon.

18. A process according to claim 16, said organic solvent-coolant being an aromatic hydrocarbon.

19. A process according to claim 16, said organic solvent-coolant being a halogenated hydrocarbon.

20. A process according to claim 16, said organic solvent-coolant being an ester solvent.

21. The process of claim 16 further characterized in that the polymerization takes place at a temperature ranging from about 115–175° C.

22. The herein described process of preparing a liquid polyterpene polymer, having a molecular weight below about 500, comprising the steps of reacting a polymerizable terpene or mixture of polymerizable terpenes with or without an organic solvent-coolant and an anhydrous metallic halide that is non-gaseous at ambient temperature to form a coordination complex of terpene and anhydrous metallic halide, and slowly decomposing the 23. A process according to claim 22, neutralizing agent being $CaCO_3 \cdot MgCO_3$, paste.

24. A process according to claim 22, neutralizing agent being an aqueous suspension of $CaCO_3 \cdot MgCO_3$.

25. A process according to claim 22, neutralizing agent being a dry powder of $CaCO_3 \cdot MgCO_3$.

26. A process according to claim 22, said neutralizing agent being aqueous ammonia solution.

27. A process according to claim 22, said neutralizing agent being $CaCO_3$ with minimum amount of water.

(References on following page)

References Cited by the Examiner

UNITED STATES PATENTS 2,405,558  8/1946  Borglin _____ 260—93.3

References Cited by the Applicant

UNITED STATES PATENTS

| | | |
|---|---|---|
| 1,938,320 | 12/1933 | Cooper. |
| 1,939,932 | 12/1933 | Thomas. |
| 2,335,912 | 12/1943 | Burroughs. |
| 2,370,688 | 3/1945 | Rummelsburg. |
| 2,391,293 | 12/1945 | Carmody. |
| 2,555,255 | 5/1951 | Suhanin. |
| 2,734,892 | 2/1956 | Carter. |

OTHER REFERENCES

P. Pfeiffer: Z. Anorg. Chem., 24, 279, 1900.

A. R. Clark: "A Study of Co-ordination Compounds of Chromium With Pyridine and Quinoline," Ph. D. Thesis, 1938, The Pennsylvania State University, University Microfilms, Ann Arbor, Mich., Publication No. 72.

DELBERT E. GANTZ, *Primary Examiner.*

G. E. SCHMITKONS, *Assistant Examiner.*